United States Patent
Leone et al.

(10) Patent No.: US 12,149,175 B2
(45) Date of Patent: Nov. 19, 2024

(54) BODY BRAKE CONTROL FOR MULTISTAGE POWER CONVERTER

(71) Applicant: SEMICONDUCTOR COMPONENTS INDUSTRIES, LLC, Phoenix, AZ (US)

(72) Inventors: Salvatore Leone, Milan (IT); Alessandro Zafarana, Milan (IT)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 85 days.

(21) Appl. No.: 17/938,397

(22) Filed: Oct. 6, 2022

(65) Prior Publication Data
US 2024/0120840 A1    Apr. 11, 2024

(51) Int. Cl.
*H02M 3/158* (2006.01)
*H02M 1/00* (2007.01)

(52) U.S. Cl.
CPC ....... *H02M 3/1586* (2021.05); *H02M 1/0038* (2021.05)

(58) Field of Classification Search
CPC . H02M 3/1586; H02M 1/0038; H02M 1/0019
See application file for complete search history.

(56) References Cited

U.S. PATENT DOCUMENTS

| | | |
|---|---|---|
| 2007/0229049 A1 | 10/2007 | Zafarana et al. |
| 2011/0241640 A1 | 10/2011 | Qiu et al. |
| 2022/0294343 A1* | 9/2022 | Peretz ................ H02M 3/1566 |

* cited by examiner

*Primary Examiner* — Jue Zhang
(74) *Attorney, Agent, or Firm* — Dickinson Wright PLLC; Jonathan A. Schnayer

(57) ABSTRACT

Systems for power conversion, and controllers and methods for operating a multiage power converter. The method includes determining a target body brake time period for setting a load current of the multistage power converter below a predetermined threshold. The method also includes activating a body brake condition for the multistage power converter. The method further includes turning off each stage in the multistage power converter when the body brake condition is active. The method also includes deactivating the body brake condition after the target body brake time period following an activation of the body brake condition.

20 Claims, 7 Drawing Sheets

BODY BRAKE CONTROL FOR MULTISTAGE POWER CONVERTER

BACKGROUND

Buck converters are widely used for middle-power applications. The buck topology offers several advantages. However, single-stage variants of the buck topology can be challenging for higher-power applications (for example, server power supplies, high current charger, etc.). Consequently, multistage variants of the buck topology are used for the design of higher-power applications. A large output filter capacitance is required in high-power applications to achieve a low voltage ripple. The filter capacitance of a buck converter can be significantly reduced by interleaving. Interleaving means all stages have same switching frequency and appropriate phase shift between them (e.g., the phase shift is 180° for two stages and the phase shift is 120° for three stages).

SUMMARY

Output voltage spikes can occur when the load current of a multistage power converter suddenly drops by a large amount. A body brake condition can be used to lessen these output voltage spikes. During the body brake condition, each stage of the multistage power converter turns off their high-side and low-side switches. However, the body brake condition reaches a point in which it no longer provides the most efficient method for returning the output voltage to its target level. The present disclosure provides methods, controllers, and systems that, among other things, determine how long to maintain a body brake condition for a multistage power converter after a strong load release event.

The present disclosure provides a method for operating a multistage power converter. The method includes determining a target body brake time period for setting a load current of the multistage power converter below a predetermined threshold. The method also includes activating a body brake condition for the multistage power converter. The method further includes turning off each stage in the multistage power converter when the body brake condition is active. The method also includes deactivating the body brake condition after the target body brake time period following an activation of the body brake condition.

The present disclosure also provides a controller for operating a multistage power converter. The controller includes, in one implementation, a body brake controller and a switch driver. The body brake controller is configured to determine a target body brake time period for setting a load current of the multistage power converter below a predetermined threshold. The body brake controller is also configured to activate a body brake condition for the multistage power converter. The body brake controller is further configured to deactivate the body brake condition after the target body brake time period following an activation of the body brake condition. The switch driver is configured to generate a plurality of driving signals to drive each stage in the multistage power converter. The switch driver is also configured to adjust the plurality of driving signals to turn off each of the stages when the body brake condition is active.

The present disclosure further provides a system for power conversion including, in one implementation, a multistage power converter and a controller. The controller is configured to determine a target body brake time period for setting a load current of the multistage power converter below a predetermined threshold. The controller is also configured to activate a body brake condition for the multistage power converter. The controller is further configured to turn off each stage in the multistage power converter when the body brake condition is active. The controller is also configured to deactivate the body brake condition after the target body brake time period following an activation of the body brake condition.

BRIEF DESCRIPTION OF THE DRAWINGS

For a detailed description of example implementations, reference will now be made to the accompanying drawings in which.

DEFINITIONS

Figure 1:
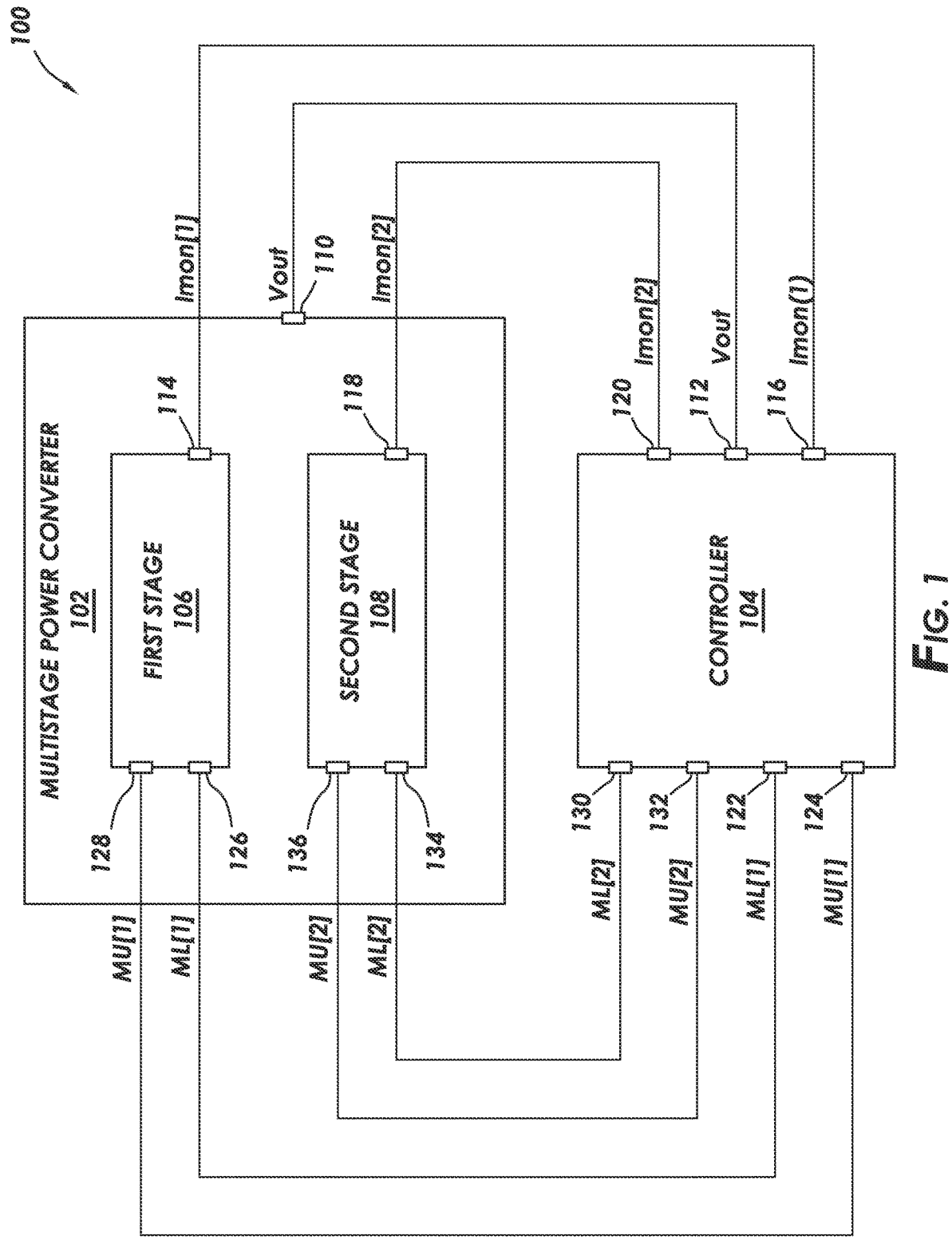
FIG. 1 is a block diagram of an example of a system for power conversion in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computing (RISC), a digital signal processor (DSP), a processor with controlling software, a programmable logic device (PLD), a field programmable gate array (FPGA), or a programmable system-on-a-chip (PSOC) configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to multistage power converters with body brake control. More particularly, various examples are directed to multistage power converters and related controllers that set a target body brake time period assuming the load current will fall to essentially zero amps after a sudden load release event. The specification now turns to an example system to orient the reader.

FIG. 1 is a block diagram of an example of a system 100 for power conversion in accordance with some implementations. The system 100 illustrated in FIG. 1 includes a multistage power converter 102 and a controller 104. The multistage power converter 102 illustrated in FIG. 1 includes a first stage 106 and a second stage 108. The methods described herein may be used with systems having fewer, additional, or different components in different configurations than the system 100 illustrated in FIG. 1. For example, the multistage power converter 102 may include more than two stages. In some implementations, the multistage power converter 102 and the controller 104 are separate components (as illustrated in FIG. 1). In alternate implementations, the multistage power converter 102 and the controller 104 may be part of the same component. For example, the multistage power converter 102 and the controller 104 may both be positioned on a single printed circuit board (PCB) and/or within a single chip housing.

The multistage power converter 102 is configured to produce an output voltage Vout. The multistage power converter 102 includes a power terminal 110 which provides the output voltage Vout to reference terminal 112 of the controller 104. The first stage 106 includes a reference terminal 114 which provides a first current monitoring signal Imon[1] to a reference terminal 116 of the controller 104. The first current monitoring signal Imon[1] represents the primary current of the first stage 106. The second stage 108 includes a reference terminal 118 which provides a second current monitoring signal Imon[2] to a reference terminal 120 of the controller 104. As explained in more detail below, the controller 104 generates pairs of complementary signals to drive the first stage 106 and the second stage 108. Also, as explained in more detail below, the controller 104 generates the pairs of complementary signals based on, e.g., the output voltage Vout, the first current monitoring signal Imon[1], and the second current monitoring signal Imon[2]. The controller 104 includes control terminals 122 and 124 to provide a pair of complementary signals (e.g., signals ML[1] and MU[1]) to control terminals 126 and 128 of the first stage 106. The controller 104 also includes control terminals 130 and 132 to provide another pair of complementary signals (e.g., signals ML[2] and MU[2]) to control terminals 134 and 136 of the second stage 108.

Figure 2:
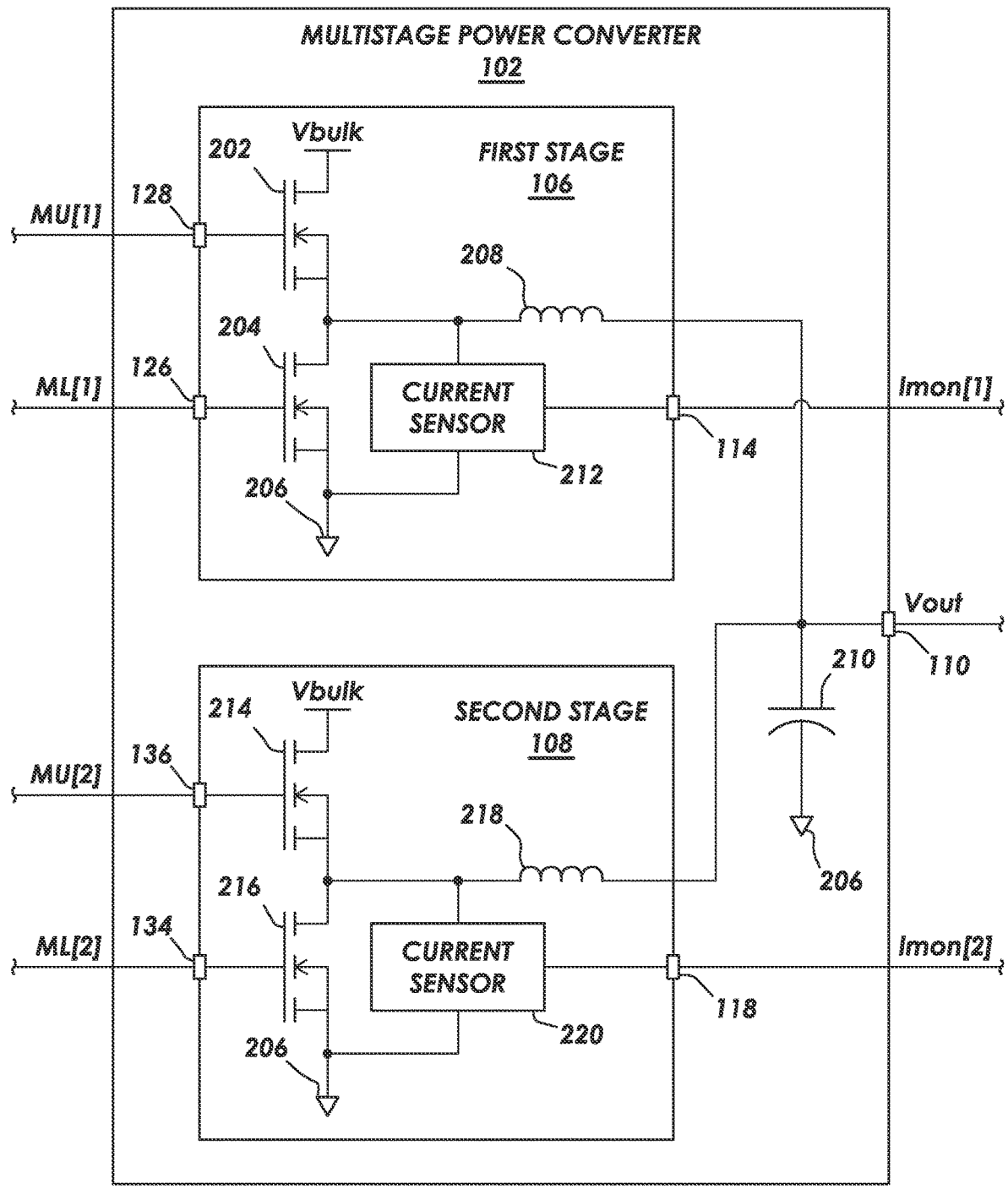
FIG. 2 is a partial schematic and a partial block diagram of an example of an multistage power converter in the system of FIG. 1 in accordance with some implementations.

FIG. 2 is a partial schematic and a partial block diagram of an example of the multistage power converter 102 in accordance with some implementations. Turning initially to the first stage 106, the first stage 106 illustrated in FIG. 2 includes a pair of transistors 202 and 204 that are coupled in a series configuration between the input voltage Vbulk and the ground terminal 206. The pair of transistors 202 and 202 are illustrated in FIG. 2 as metal-oxide-semiconductor field-effect transistors (MOSFETs), and in particular, N-channel MOSFETs. However, other types of FETs may be used (e.g., P-channel MOSFETs), and in fact other types of transistors may also be used (e.g., bi-polar junction transistors (BJTs)). The gate terminals of the transistors 202 and 204 are coupled to control terminals 128 and 126, respectively, to receive signals MU[1] and MU[2] from the controller 104. The pair of complementary signals drive the pair of transistors 202 and 204 to generate a square wave input at the switch node defined between the transistors 202 and 204. The first stage 106 illustrated in FIG. 2 also includes an inductor 208 that operates with a capacitor 210 to reduce voltage ripple in the square wave input. The first stage 106 illustrated in FIG. 2 also includes a current sensor 212 to generate the first current monitoring signal Imon[1]. The current sensor 212 is coupled to the reference terminal 114 to provide the first current monitoring signal Imon[1] to the controller 104.

Turning now to the second stage 108, the second stage 108 illustrated in FIG. 2 includes a pair of transistors 214 and 216 that are coupled in a series configuration between the input voltage Vbulk and the ground terminal 206. The gate terminals of the transistors 214 and 216 are coupled to control terminals 136 and 134, respectively, to receive signals MU[2] and ML[2] from the controller 104. The pair of complementary signals drive the pairs of transistors 214 and 216 to generate a square wave input at the switch node defined between the transistors 214 and 216. The second stage 108 illustrated in FIG. 2 also includes an inductor 218 that operates with the capacitor 210 to reduce voltage ripple in the square wave input. The second stage 108 illustrated in FIG. 2 also includes a current sensor 220 to generate the second current monitoring signal Imon[2]. The square wave input generated by the second stage 108 combines with the square wave input generated by the first stage 106 to produce a direct current (DC) voltage with a voltage ripple at the power terminal 110 (i.e., the output voltage Vout). The current sensor 220 is coupled to the reference terminal 118 to provide the second current monitoring signal Imon[2] to the controller 104.

Figure 3:
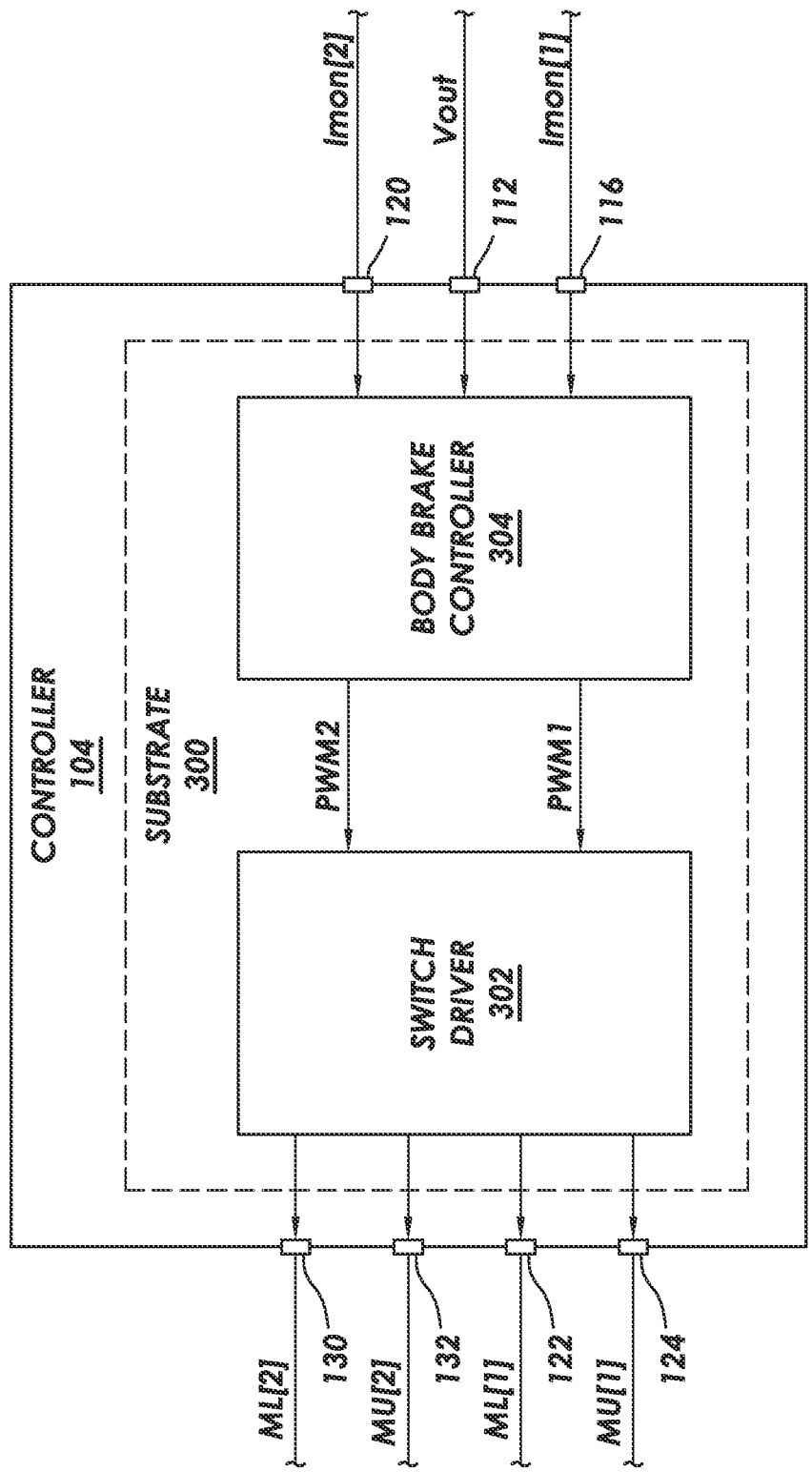
FIG. 3 is a block diagram of an example of a controller in the system of FIG. 1 in accordance with some implementations.

FIG. 3 is a block diagram of an example of the controller 104 in accordance with some implementations. In particular, the controller 104 may comprise electrical devices and circuits monolithically created on a substrate 300 and encapsulated within packaging; however, the functionality of the various components may be embodied on multiple substrates that are co-packaged (e.g., multi-chip module) and electrically coupled to each other and coupled to the various terminals. The controller 104 illustrated in FIG. 3 includes reference terminals 112, 116, and 120 and control terminals 122, 124, 130, and 132. The example terminals are electrical connections exposed and accessible through the packaging. Additional terminals will be present (e.g., power terminal, reference voltage terminal, ground terminal), but those additional terminals are not shown so as not to unduly complicate the figure. The functionality of the controller 104 described herein may be conceptually, though not necessarily physically, divided into a switch driver 302 and a body brake controller 304. In some implementations, the switch driver 302 is located in the multistage power converter 102 instead of the controller 104. For example, each stage of the multistage power converter 102 may include a driver for its transistors.

Various functional components of the controller 104 implement switch driving (e.g., switch driver 302). The switch driver 302 generates signals MU[1] and ML[1] to drive the first stage 106 of the multistage power converter 102. The switch driver 302 also generates signals MU[2] and ML[2] to drive the second stage 108 of the multistage power converter 102. The switch driver 302 illustrated in FIG. 3 is coupled to control terminals 122 and 124 to provide signals ML[1] and MU[1] to the first stage 106. In addition, the switch driver 302 is coupled to control terminals 130 and 132 to provide signals ML[2] and MU[2] to the second stage 108. The switch driver 302 is coupled to the body brake controller 304 to receive a first control signal PWM1 and a second control signal PWM2. The switch driver 302 generates signals MU[1] and ML[1] based on the first control signal PWM1. For example, the switch driver 302 may assert signal MU[1] and de-assert signal ML[1] when the first control signal PWM1 is set to a high value. Further, the switch driver 302 may de-assert signal MU[1] and assert signal ML[1] when the first control signal PWM1 is set to a low value. The switch driver 302 generates signals MU[2] and ML[2] based on the second control signal PWM2. For example, the switch driver 302 may assert signal MU[2] and de-assert signal ML[2] when the second control signal PWM2 is set to a high value. Further, the switch driver 302 may de-assert signal MU[2] and assert signal ML[2] when the second control signal PWM2 is set to a low value.

In some situations, the load current of the multistage power converter 102 suddenly drops by a large amount (referred to herein as a "strong load release event"). For example, the load current of the multistage power converter 102 may suddenly drop by a large amount when the multistage power converter 102 is providing energy to a server farm and a significant number of the servers shut-down (or enter a low-power state) because they are no longer in use. When a strong load release event occurs, the output voltage Vout of the multistage power converter 102 spikes. For example, looking at the plots illustrated in FIG. 4, at a time of about 100 microseconds, the load current suddenly drops from about 130 Amps to about 15 Amps. In response to this strong load release event, the output voltage Vout quickly spikes upward. After reaching a peak, the output voltage Vout decreases at a rate of approximately Vout/L, wherein L is the inductance of the inductors 208 and 218. To increase the negative slope of the output voltage Vout, a body brake condition can be activated for the multistage power converter 102 by turning off the first stage 106 and the second stage 108. The first stage 106 is turned off by turning off transistors 202 and 204, and the second stage 108 is turned off by turning off transistors 214 and 216. Turning off transistors 202, 204, 214, and 216 increases the negative slope of the output voltage Vout from Vout/L to (Vout+Vdiode)/L, with Vdiode being the voltage value across the body drain diode (i.e., intrinsic diode) of the low side switches (i.e., transistors 204 and 216) under the off condition. In increasing the negative slope of the output voltage Vout, the body brake condition decreases the amount of excess charge of the output voltage Vout after a strong load release event.

Returning to FIG. 3, in some implementations, the switch driver 302 is configured to turn off transistors 202 and 204 in the first stage 106 by de-asserting signals ML[1] and MU[1]. Further, the switch driver 302 is configured to turn off transistors 214 and 216 in the second stage 108 by de-asserting signals ML[2] and MU[2]. In some implementations, the switch driver 302 turns off transistors 202 and 204 when the first control signal PWM1 is set to a mid-level value. Further the switch driver 302 turns off transistors 214 and 216 when the second control signal PWM2 is set to a mid-level value.

Various functional components of the controller 104 also implement body brake control (e.g., body brake controller 304). The body brake controller 304 illustrated in FIG. 3 is coupled to reference terminals 112, 116, and 120 to receive the output voltage Vout, the first current monitoring signal Imon[1], and the second current monitoring signal Imon[2], respectively. The body brake controller illustrated in FIG. 3 is also coupled to the switch driver 302 to provide the first control signal PWM1 and the second control signal PWM2 thereto.

As described above, the body brake condition is activated when a strong load release event is detected. In some implementations, the body brake controller 304 detects a strong load release event based on the output voltage Vout, the first current monitoring signal Imon[1], the second current monitoring signal Imon[2], or a combination thereof. For example, the body brake controller 304 may detect a strong load release event when the output current (as determined, e.g., by the first current monitoring signal Imon[1] and the second current monitoring signal Imon[2]) is greater than a threshold. As a further example, the body brake controller 304 may detect a strong load release event when the change in the output voltage Vout over a period of time is greater than a threshold. As a further example, the body brake controller 304 may detect a strong load release event when an integrated circuit (IC) variable saturates low (e.g., in a fixed frequency pulse-width modulator (PWM) when the duty cycle is zero in a switching period or the switching frequency goes to zero).

Figure 4:
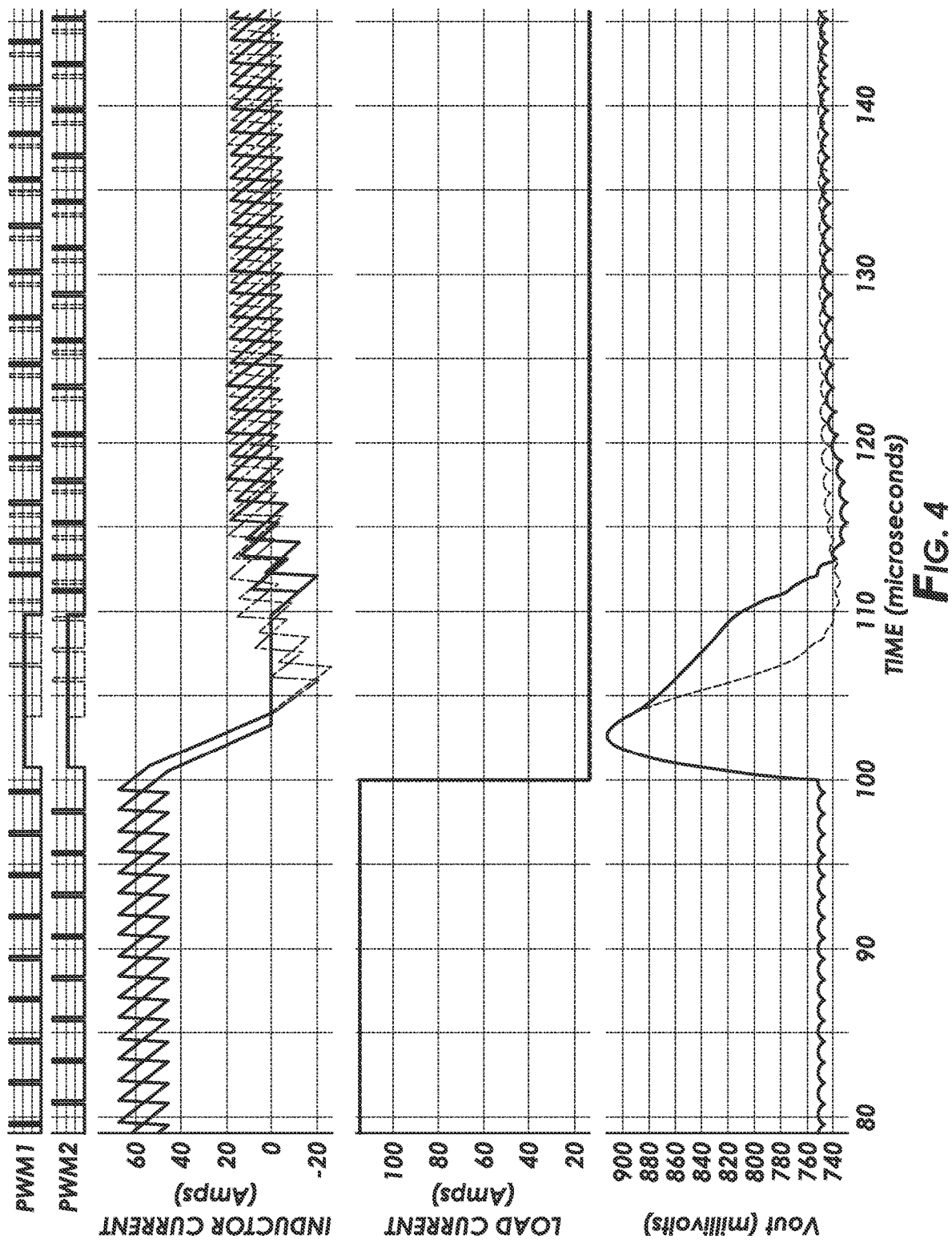
FIG. 4 is a partial timing diagram and a partial results plot of example operations of a multistage power converter when a body brake condition is activated for a target time period and for longer than the target time period in accordance with some implementations.

As illustrated in FIG. 4, the body brake condition is activated when the first control signal PWM1 and the second control signal PWM2 are set to mid-level values at a time of about 101 microseconds. After the body brake condition is activated, the currents flowing through inductors 208 and 218 (referred to herein as the "inductor currents") fall until they reach zero amps. If the body brake condition remains activated after the inductor currents reach zero amps, the negative slope of the output voltage Vout decreases because no additional current is drained via the inductors 208 and 218. For example, the solid plot lines illustrated in FIG. 4 are an example outcome when the body brake condition remains activated after the load currents reach zero amps. As illustrated in FIG. 4, the negative slope of the output voltage Vout decreases after the load currents reach zero amps at a time of about 104 microseconds. The decrease in negative slope of the output voltage Vout extends the overall duration of the voltage spike. To shorten the duration of the voltage spike, the body brake condition can be deactivated shortly after the inductor currents reach zero amps. After the body brake condition is deactivated, the switch driver 302 resumes pulsing which increases the negative slope of the output voltage Vout. For example, the dashed plot lines illustrated in FIG. 4 represent an example outcome when the body brake condition is deactivated shortly after the inductor currents reach zero amps. As illustrated in FIG. 4, the output voltage Vout returns to the steady-state voltage faster when the body brake condition is deactivated shortly after the inductor currents reach zero amps. However, when the body brake condition is activated, the first current monitoring signal Imon[1] and the second current monitoring signal Imon[2] are not available. Thus, while the body brake condition is activated, the body brake controller 304 may be unable to detect when the inductor currents reach zero amps. Instead of detecting when the inductor currents reach zero amps while the body brake condition is activated following a strong load release event, the body brake controller 304 is configured to determine a target body brake time period before a strong load release event occurs. The target body brake time period represents an estimation of the time period it will take the inductor currents to reach zero amps after the body brake condition is activated. As the body brake controller 304 may not know the new, lower load current level before a strong load release event occurs, the body brake controller 304 determines the target body brake time period for setting the load current of the multistage power converter 102 below a predetermined threshold. For example, the body brake controller 304 may determine the target body brake time period assuming that the load current of the multistage power converter 102 will drop from its current level down to zero amps. Further, the body brake controller 304 may determine the target body brake time period based on, e.g., the load current (i.e., the load current level before a sudden load release event occurs), the output voltage Vout, the number of the stages in the multistage power converter 102, or a combination thereof. For example, the body brake controller 304 may determine the target body brake time period based on Equation 1 below:

$$T\_BBR = Iout/[(Vref+Vdiode)/L \times Nstage] \quad \text{Equation 1}$$

where:
T_BBR=target body brake time period;
Iout=load current of the multistage power converter 102;
Vref=output voltage Vout;
Vdiode=voltage value across the body drain diode (i.e., intrinsic diode) of the low side switches under the off condition;
L=inductance of inductors 208 and 218; and
Nstage=number of stages in the multistage power converter 102.

The body brake controller 304 may determine the load current/out based on the first current monitoring signal Imon[1] and the second current monitoring signal Imon[2]. Some parameters of Equation 1 are fixed, known parameters (e.g., Vdiode, L, and Nstage). However, other parameters of Equation 1 may fluctuate prior to a sudden load release event (e.g., Iout, and Vref). Thus, in some implementations, the body brake controller 304 updates the target body brake time period when the body brake condition is deactivated. For example, the body brake controller 304 may continuously or periodically update the target body brake time period when the body brake condition is deactivated. Further, because information related to current is unavailable when the body brake condition is activated, the body brake controller 304 may refrain from updating the target body brake time period when the body brake condition is activated.

Figure 5:
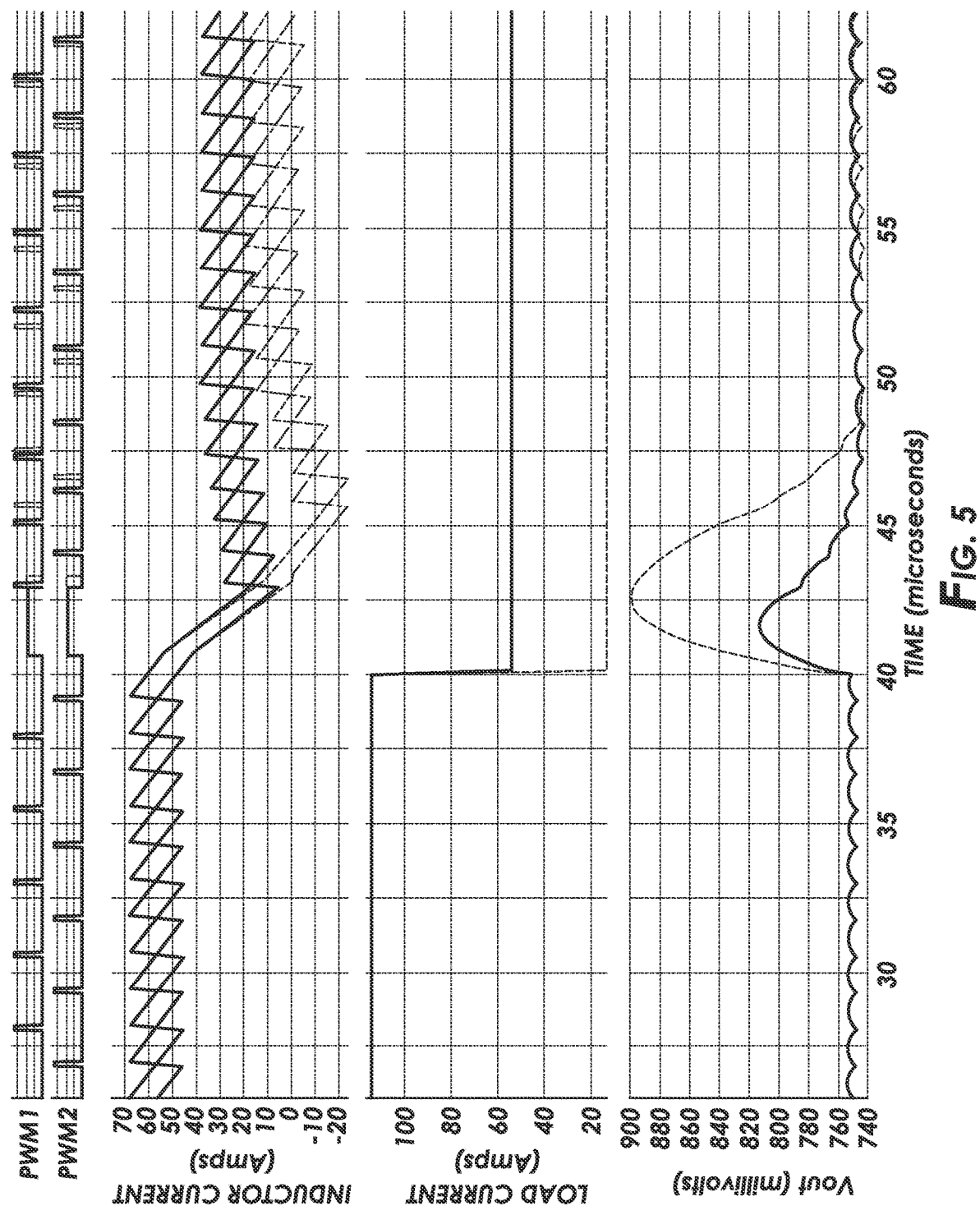
FIG. 5 is a partial timing diagram and a partial results plot of example operations of a multistage power converter when a body brake condition is activated for less than a target time period in accordance with some implementations.

As described above, the target body brake time period is determined to set the load current below a predetermined threshold (e.g., approximately zero amps). In some situations, the new, lower level of load current after a sudden load release event may still be high enough such that the target body brake time period is longer than the time it takes for the output voltage Vout to return to a steady-state voltage. If the body brake condition remains active after the output voltage Vout reaches its steady-state voltage, the output voltage Vout may drop significantly below its steady-state voltage. In some implementations, the controller 104 is configured to deactivate the body brake condition when the output voltage Vout crosses a threshold voltage. The threshold voltage may be a predetermined voltage that is greater than the steady-state voltage. For example, the solid plots illustrated in FIG. 5 are an example outcome for a strong load release event from about 130 Amps to about 60 Amps. As illustrated in FIG. 5, the first control signal PWM1 and the second control signal PWM2 leave the mid-level value at a time of about 43.5 microseconds when the output voltage Vout crosses a threshold voltage (about 800 millivolts in FIG. 5). The body brake condition is deactivated in FIG. 5 prior to the end of the target body brake time period and before the inductor currents reach zero amps. Thus, even though the body brake condition is active for a time period that is less than the target body brake time period, the body brake condition is still active as long as possible in this situation to reduce the voltage spike. The result being that the spike of the output voltage Vout is reduced in this situation as well. The dashed line plots in FIG. 5 illustrate another example outcome for a strong load release event from about 130 Amps to about 15 Amps. Similar to the other example illustrated in FIG. 5, the body brake condition is deactivated prior to the end of the target body brake time period.

Figure 6:
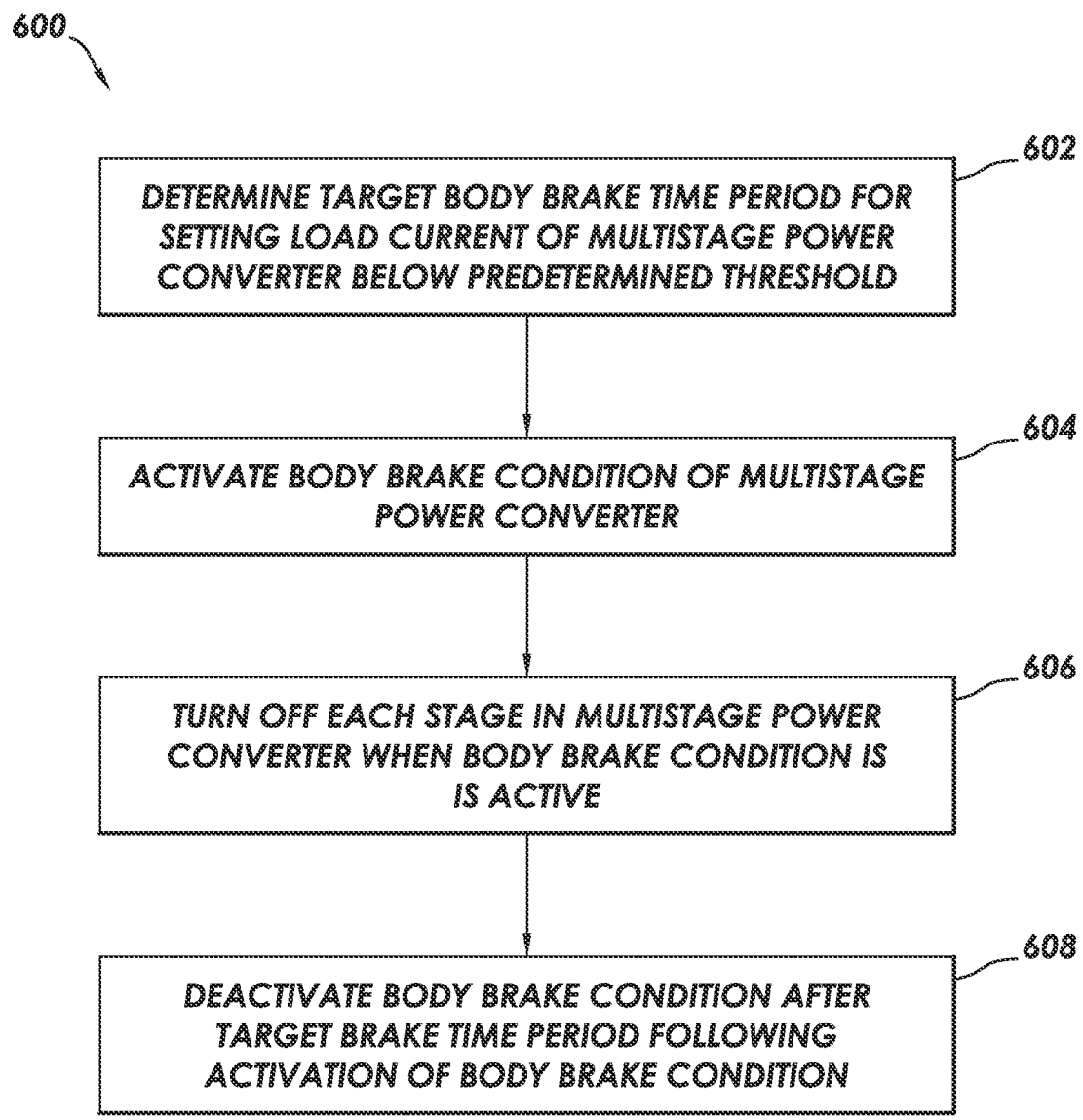
FIG. 6 is a flow diagram of an example of a method for operating a multistage power converter in accordance with some implementations in accordance with some implementations.

FIG. 6 is a flow diagram of an example of a method 600 for operating the multistage power converter 102 in accordance with some implementations. At block 602, a target body brake time period is determined for setting a load current of the multistage power converter 102 below a predetermined threshold. For example, the controller 104 may determine the target body brake time period using any of the methods described previously herein. At block 604, a body brake condition of the multistage power converter 102 is activated. For example, the body brake controller 304 may set the first control signal PWM1 and the second control signal PWM2 to mid-level values. At block 606, each stage in the multistage power converter 102 is turned off when the body brake condition is active. For example, the controller 104 (or more particularly, the switch driver 302) de-asserts signal MU[1], signal ML[1], signal MU[2], and signal ML[2] so that transistors 202, 204, 214, and 216 are all turned off. At block 608, the body brake condition is deactivated after the target body brake time period following activation of the body brake condition. For example, the body brake controller 304 may set the first control signal PWM1 to a high-value and the second control signal PWM2 to a low value.

Figure 7:
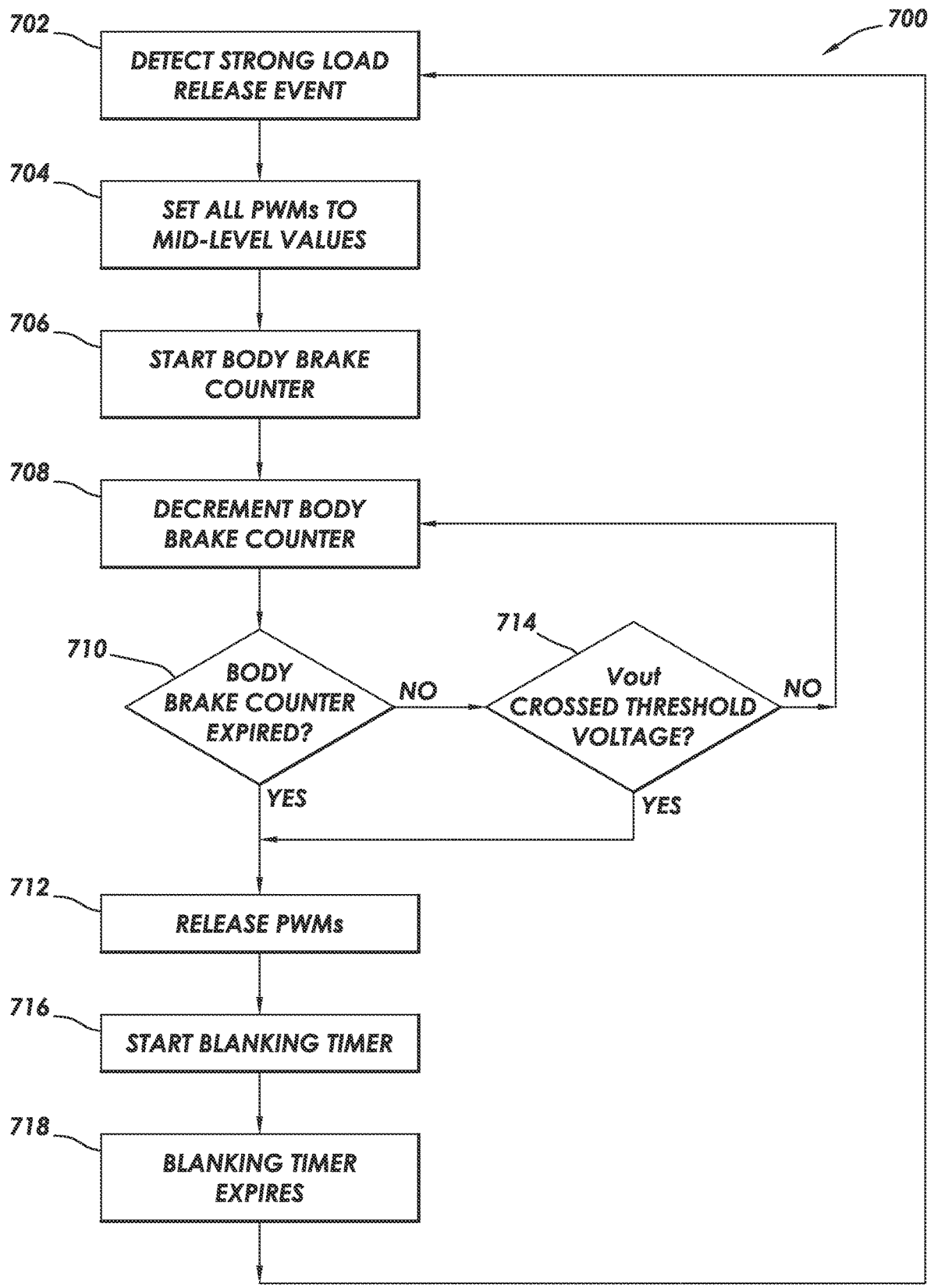
FIG. 7 is a flow diagram of an example of a method for operating a multistage power converter with a blanking timer in accordance with some implementations.

In some implementations, the body brake controller 304 implements a blanking timer for detecting strong load release events. FIG. 7 is a flow diagram of an example of a method 700 for operating the multistage power converter 102 with a blanking timer in accordance with some implementations. At block 702, a strong load release event is detected. For example, the body brake controller 304 may detect a strong load release event based on the first current monitoring signal Imon[1] and the second current monitoring signal Imon[2]. At block 704, all the PWMs are set to mid-level values. For example, the body brake controller 304 may set the first control signal PWM1 and the second control signal PWM2 to mid-level values. At block 706, a body brake counter is started. For example, the body brake counter is set based on the target body brake time period. At block 708, the body brake counter is decremented. For example, the body brake counter is decreased by one. At block 710, the body brake controller 304 determines whether the body brake counter is expired. For example, the body brake controller 304 may determine the body brake counter is expired when the body brake counter is equal to zero. When the body brake counter is expired, the method 700 proceeds to block 712 and the PWMs are released. Alternatively, when the body brake counter is not expired, the method proceeds to block 714 and the body brake controller 304 determines whether the output voltage Vout has crossed a threshold voltage. For example, the body brake controller 304 may determine the output voltage Vout has crossed the threshold voltage when the output voltage Vout is less than or equal to the threshold voltage. When the output voltage Vout has not crossed the threshold voltage, the method returns to block 708 to decrement the body brake counter again. Alternatively, when the output voltage Vout has crossed the threshold voltage, the method 700 proceeds to block 712. At block 712, the PWMs are released. For example, the body brake controller 304 may set the first control signal PWM1 to a high value and the second control signal PWM2 to a low value. At block 716, a blanking timer is starting. The duration of the blanking timer may be predetermined. During the blanking timer, the body brake controller 304 ignores all indications that a strong load release event may be occurring. At block 718, the blanking timer expires and the method 700 returns to block 702 to detect the next strong load release event.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A method for operating a multistage power converter, the method comprising:
    determining a target body brake time period for setting a load current of the multistage power converter below a predetermined threshold;
    activating a body brake condition for the multistage power converter;
    turning off each stage in the multistage power converter when the body brake condition is active; and
    deactivating the body brake condition after the target body brake time period following an activation of the body brake condition.

2. The method of claim 1, wherein the target body brake time period is further determined based on at least one selected from the group consisting of the load current of the multistage power converter, an output voltage of the multistage power converter, and a number of the stages in the multistage power converter.

3. The method of claim 1, further comprising:
    updating the target body brake time period when the body brake condition is deactivated; and
    refraining from updating the target body brake time period when the body brake condition is activated.

4. The method of claim 1, further comprising:
    detecting an output voltage of the multistage power converter cross a threshold voltage while the body brake condition is active, and
    deactivating the body brake condition when the output voltage of the multistage power converter is detected crossing the threshold voltage.

5. The method of claim 1, wherein activating the body brake condition for the multistage power converter further comprises:
    detecting a strong load release event of the multistage power converter, and
    activating the body brake condition for the multistage power converter when the strong load release event of the multistage power converter is detected.

6. The method of claim 1, further comprising:
    enacting a predetermined period of blanking time following a deactivation of the body brake condition;
    detecting a strong load release event of the multistage power converter during the predetermined period of blanking time; and
    refrain from activating the body brake condition for the multistage power converter when the strong load release event of the multistage power converter is detected.

7. The method of claim 1, wherein determining the target body brake time period for setting the load current of the multistage power converter below the predetermined threshold further comprises determining the target body brake time period for setting the load current of the multistage power converter to zero amps.

8. A controller for operating a multistage power converter, the controller comprising:
    a body brake controller configured to:
        determine a target body brake time period for setting a load current of the multistage power converter below a predetermined threshold,
        activate a body brake condition for the multistage power converter, and
        deactivate the body brake condition after the target body brake time period following an activation of the body brake condition; and
    a switch driver configured to:
        generate a plurality of driving signals to drive each stage in the multistage power converter, and
        adjust the plurality of driving signals to turn off each of the stages when the body brake condition is active.

9. The controller of claim 8, wherein the body brake controller is further configured to determine the target body brake time period based on at least one selected from the group consisting of the load current of the multistage power converter, an output voltage of the multistage power converter, and a number of the stages in the multistage power converter.

10. The controller of claim 8, wherein the body brake controller is further configured to:
    update the target body brake time period when the body brake condition is deactivated, and
    refrain from updating the target body brake time period when the body brake condition is activated.

11. The controller of claim 8, wherein the body brake controller is further configured to:
    detect an output voltage of the multistage power converter cross a threshold voltage while the body brake condition is active; and deactivate the body brake condition when the output voltage of the multistage power converter is detected crossing the threshold voltage.

12. The controller of claim 8, wherein, to activate the body brake condition for the multistage power converter, the body brake controller is further configured to:
   detect a strong load release event of the multistage power converter, and
   activate the body brake condition for the multistage power converter when the strong load release event of the multistage power converter is detected.

13. The controller of claim 8, wherein the body brake controller is further configured to:
   enact a predetermined period of blanking time following a deactivation of the body brake condition,
   detect a strong load release event of the multistage power converter during the predetermined period of blanking time, and
   refrain from activating the body brake condition for the multistage power converter when the strong load release event of the multistage power converter is detected.

14. The controller of claim 8, wherein, to determine the target body brake time period for setting the load current of the multistage power converter below the predetermined threshold, the body brake controller is further configured to determine the target body brake time period for setting the load current of the multistage power converter to zero amps.

15. A system for power conversion, comprising:
   a multistage power converter; and
   a controller configured to:
      determine a target body brake time period for setting a load current of the multistage power converter below a predetermined threshold,
      activate a body brake condition for the multistage power converter,
      turn off each stage in the multistage power converter when the body brake condition is active, and
      deactivate the body brake condition after the target body brake time period following an activation of the body brake condition.

16. The system of claim 15, wherein the controller is further configured to determine the target body brake time period based on the target body brake time period based on at least one selected from the group consisting of the load current of the multistage power converter, an output voltage of the multistage power converter, and a number of the stages in the multistage power converter.

17. The system of claim 15, wherein the controller is further configured to:
   update the target body brake time period when the body brake condition is deactivated, and
   refrain from updating the target body brake time period when the body brake condition is activated.

18. The system of claim 15, wherein the controller is further configured to:
   detect an output voltage of the multistage power converter cross a threshold voltage while the body brake condition is active; and
   deactivate the body brake condition when the output voltage of the multistage power converter is detected crossing the threshold voltage.

19. The system of claim 15, wherein, to activate the body brake condition for the multistage power converter, the controller is further configured to:
   detect a strong load release event of the multistage power converter, and
   activate the body brake condition for the multistage power converter when the strong load release event of the multistage power converter is detected.

20. The system of claim 15, wherein the controller is further configured to:
   enact a predetermined period of blanking time following a deactivation of the body brake condition,
   detect a strong load release event of the multistage power converter during the predetermined period of blanking time, and
   refrain from activating the body brake condition for the multistage power converter when the strong load release event of the multistage power converter is detected.

* * * * *